(12) United States Patent
Zheng et al.

(10) Patent No.: US 9,325,628 B2
(45) Date of Patent: Apr. 26, 2016

(54) PACKET HANDLING METHOD, FORWARDING DEVICE AND SYSTEM

(71) Applicant: Huawei Technologies Co., Ltd., Shenzhen, Guangdong (CN)

(72) Inventors: Hewen Zheng, Shenzhen (CN); Haibin Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 376 days.

(21) Appl. No.: 14/039,521

(22) Filed: Sep. 27, 2013

(65) Prior Publication Data

US 2014/0029620 A1  Jan. 30, 2014

Related U.S. Application Data

(63) Continuation of application No. PCT/CN2011/083018, filed on Nov. 28, 2011.

(30) Foreign Application Priority Data

Mar. 29, 2011 (CN) .......................... 2011 1 0078459

(51) Int. Cl.
*H04L 12/28* (2006.01)
*H04L 12/807* (2013.01)
*H04L 1/16* (2006.01)
*H04L 29/06* (2006.01)

(52) U.S. Cl.
CPC .............. *H04L 47/27* (2013.01); *H04L 1/1607* (2013.01); *H04L 69/16* (2013.01); *H04L 69/161* (2013.01); *H04L 69/163* (2013.01)

(58) Field of Classification Search
CPC ........ H04L 47/27; H04L 1/1607; H04L 69/16
See application file for complete search history.

(56) References Cited

U.S. PATENT DOCUMENTS

| 6,118,765 A * | 9/2000 | Phillips | H04L 1/1838 370/235 |
| 6,934,257 B2 * | 8/2005 | Liu | H04L 69/165 370/236 |

(Continued)

FOREIGN PATENT DOCUMENTS

| CN | 101854738 A | 10/2010 |
| CN | 101924625 A | 12/2010 |

(Continued)

OTHER PUBLICATIONS

International Search Report in corresponding PCT Patent Application No. PCT/CN2011/083018 (Mar. 8, 2012).

(Continued)

*Primary Examiner* — Hassan Kizou
*Assistant Examiner* — Abdelnabi Musa
(74) *Attorney, Agent, or Firm* — Leydig, Voit & Mayer, Ltd.

(57) ABSTRACT

A packet handling method, comprising: receiving a TCP ACK packet currently sent by a client; searching in a storage device for a TCP packet requested for retransmission by the TCP ACK packet when it is determined that the Acknowledge Number field value in the TCP header of the TCP ACK packet currently sent by the client is equal to that previously sent by the client over the same TCP connection; discarding the TCP ACK packet and transmitting the TCP packet to the client when the TCP packet requested for retransmission is found in the storage device. In comparison to the prior art, where the TCP packet at anytime is directly transmitted by a server to the client via the forwarding device, bandwidth between the server and the forwarding device is saved, thereby network congestion is reduced, and network resource utilization is increased.

16 Claims, 5 Drawing Sheets (56) References Cited

U.S. PATENT DOCUMENTS

| | | | |
|---|---|---|---|
| 8,432,806 B2* | 4/2013 | Fu | H04L 47/10 370/235 |
| 2003/0055980 A1* | 3/2003 | Liu | H04L 1/1621 709/227 |
| 2004/0213278 A1* | 10/2004 | Pullen | H04L 1/1635 370/428 |
| 2004/0264370 A1* | 12/2004 | Moon | H04L 47/10 370/229 |
| 2005/0102416 A1 | 5/2005 | Miller-Smith | |
| 2009/0161680 A1* | 6/2009 | Ishikawa | H04L 69/16 370/400 |
| 2012/0201136 A1* | 8/2012 | Williams | H04W 28/0273 370/231 |

FOREIGN PATENT DOCUMENTS

| | | |
|---|---|---|
| CN | 102143078 A | 8/2011 |
| EP | 1169826 A2 | 1/2002 |
| EP | 1300991 A1 | 4/2003 |
| WO | WO 0021233 A2 | 4/2000 |
| WO | WO 03069870 A2 | 8/2003 |

OTHER PUBLICATIONS

Kim et al., "On the Cross-Layer Impact of TCP ACK Thinning on IEEE 802.11 Wireless MAC Dynamics," 2006, IEEE, New York, New York.

Jacobson et al., "TCP Extensions for High Performance", May 1992, Network Working Group, IETF, Fremont, California.

* cited by examiner

PACKET HANDLING METHOD, FORWARDING DEVICE AND SYSTEM

CROSS-REFERENCE TO RELATED APPLICATIONS

This application is a continuation of International Patent Application No. PCT/CN2011/083018, filed Nov. 28, 2011, which claims the priority to Chinese Patent Application No. 201110078459.X, filed on Mar. 29, 2011, both of which are hereby incorporated by reference in their entireties.

FIELD OF THE INVENTION

The present invention relates to the communication technical field, and more particularly to a packet handling method, a forwarding device and a system.

BACKGROUND OF THE INVENTION

In current networks, network traffic is mainly composed of video service traffic. On Oct. 20 2010, Sandvine published a monitoring report on network traffic, in which video service traffic from Netflix took 20 percent of downstream data from PM 8:00 to PM 10:00 in all America. It is predicted that video service traffic will take 91 percent of network traffic by 2014.

Video data is transmitted in the format of TCP packets by means of a sliding window transmission mechanism, particularly in the following process.

Step A: a TCP connection is established between a client and a server; the server and the client transmit their maximum data reception sizes to each other.

It should be noted that before receiving a TCP ACK packet (i.e., a TCP acknowledgement message with an ACK flag bit in the TCP header of the message being set to 1) from the client, the amount of data the server transmits in one transmission will not exceed the maximum data reception size of the client. At the same time, the client carries its current maximum data reception size in the TCP ACK packet (i.e., as identified in the window field of the TCP header);

The send window of the server, i.e., the size of data that is transmitted in one transmission by the server is not larger than that of the smaller one between the maximum data reception size of the client and a congestion window cwnd.

Step B: the server sends a first TCP packet;

The server receives the first TCP ACK packet and sets the congestion window cwnd to two packets, i.e., the server may send two TCP packets to the client in one transmission;

The server sends two subsequent TCP packets continuously, receives a second and third TCP ACK packets and sets the congestion window cwnd to 4, i.e., the server may send four TCP packets to the client in one transmission;

After the server subsequently sends TCP packets and receives all TCP ACK packets for this TCP connection from the client, cwnd is increased by 1 every time the server receives a TCP ACK packet, which is known as SS (slow start) phase, until the congestion window cwnd is increased to a SS phase threshold ssthresh, which is 65536 bytes for most TCP implementations.

Step C: when the congestion window cwnd is increased to the SS phase threshold, and after it is acknowledged by the client with TCP ACK that all TCP packets sent to the client from the server have been received successfully, the server congestion window is increased by 1, which is known as CA (congestion avoidance), until the congestion window cwnd reaches the maximum data reception size of the client.

Step D: the client checks the sequence number of a received TCP packet, and when the sequence number in the TCP header of the TCP packet is larger than the sum of the sequence number in the TCP header of a TCP packet previously received by the client and the number of bytes in the payload (excluding the TCP header) of the TCP packet received previously, indicating the loss of a TCP packet, the client sends TCP ACK packets repeatedly to request the server to retransmit the lost TCP packet.

After noticing packet loss, the server sets the slow start phase threshold ssthresh to half of the current congestion window cwnd, resets the congestion window to 1, and re-enters the slow start phase (SS).

It can be seen from the above TCP packet handling process, after TCP packet loss occurs, the TCP congestion window cwnd is rapidly reduced, and it is also necessary to spend time to handle retransmission, which means a rapid drop in TCP throughput. For those real time applications sensitive to latency or throughput, such as video communication, user experience may be degraded significantly.

To address this problem, congestion window cwnd may be disabled on the server, causing that it is unable to adjust the number of bytes sent by the server according to network congestion conditions, thereby further aggravating network congestion and reducing network resource utilization ratio.

SUMMARY OF THE INVENTION

To address the technical problems above, a packet handling method, a packet forwarding device and system are provided in embodiments of this invention to solve the problem of further aggravated network congestion and lowered network resource utilization ratio due to disabled congestion window cwnd on the server. The technical solutions are as follows.

According to one aspect of embodiments of this invention, a packet handling method is provided, comprising:

receiving a TCP ACK packet currently sent by a client;

searching in a storage device for a TCP packet from a server requested for retransmission by the TCP ACK packet when it is determined that an Acknowledge Number field value in the TCP header of the TCP ACK packet currently sent by the client is equal to an Acknowledge Number field value in the TCP header of a TCP ACK packet previously sent by the client to the same TCP connection;

discarding the TCP ACK packet and transmitting the TCP packet from the server to the client that sends the TCP ACK packet when the TCP packet from the server requested for retransmission by the TCP ACK packet from the client is found in the storage device.

According to another aspect of embodiments of this invention, a forwarding device is provided, comprising:

an ACK packet receiving module, for receiving a TCP ACK packet currently sent by a client;

a field value determining module, for determining an Acknowledge Number field value in the TCP header of the TCP ACK packet currently sent by the client and an Acknowledge Number field value in the TCP header of a TCP ACK packet previously sent by the client in the same TCP connection;

a TCP packet searching module, for searching in a storage device for a TCP packet requested for retransmission by the TCP ACK packet when it is determined that the Acknowledge Number field value in the TCP header of the TCP ACK packet currently sent by the client is equal to the Acknowledge Number field value in the TCP header of the TCP ACK packet previously sent by the client in the same TCP connection;

a TCP packet sending module, for discarding the TCP ACK packet and transmitting the TCP packet to the client sending the TCP ACK packet when the TCP packet requested for retransmission by the TCP ACK packet is found in the storage device.

According to another aspect of embodiments of this invention, a packet handling system is provided, comprising: a client, a server and a forwarding device, wherein packets are transmitted between the client and the server via the forwarding device; and the forwarding device is used to receive a TCP ACK packet currently sent by a client, to search in a storage device for a TCP packet requested for retransmission by the TCP ACK packet when it is determined that the Acknowledge Number field value in the TCP header of an TCP ACK packet currently sent by the client is equal to an Acknowledge Number field value in the TCP header of a TCP ACK packet previously sent by the client in the same TCP connection, and to discard the TCP ACK packet and to transmit the TCP packet to the client sending the TCP ACK packet when the TCP packet requested for retransmission is found in the storage device.

With the above technical solutions, after receiving a TCP ACK packet, the forwarding device searches in a storage device for a TCP packet requested for retransmission by the TCP ACK packet when it is determined that the Acknowledge Number field value in the TCP header of the TCP ACK packet currently sent by the client is equal to the Acknowledge Number field value in the TCP header of a TCP ACK packet previously sent by the client in the same TCP connection; when the TCP packet requested for retransmission by the TCP ACK packet is found in the storage device, the forwarding device transmits the TCP packet to the client. In comparison to the prior art, where a TCP packet at anytime is directly transmitted from a server to the client via the forwarding device, bandwidth between the server and the forwarding device can be saved, and bandwidth utilization ratio can be improved, thereby leading to reduced network congestion and increased network resource utilization ratio.

DETAILED DESCRIPTION OF THE EMBODIMENTS

For a better understanding of this invention by those skilled in the art, at first, TCP packets and TCP ACK packets will be briefly described.

A TCP connection is established between a server and a client via a forwarding device to transmit packets. The server sends a TCP packet to the client via the TCP connection. A "Sequence Number" field in the TCP header of the TCP packet carries the first byte's sequence number of the packet payload therein. After receiving the TCP packet, the client sends a TCP ACK packet to the server via the TCP connection. The "Acknowledge Number" field value in the TCP header of the TCP ACK packet indicates the "Sequence Number" field value of the next packet which is expected by the client from the server, and meanwhile implies that all data sent from the server having "Sequence Number" values smaller than the TCP ACK packet's "Acknowledge Number" value have been received by the client.

Below, a particular example will be illustrated. Packets are transmitted between a server having an IP address 192.168.0.199 and a client having an IP address 192.168.0.8 via a forwarding device. The first packet received by the forwarding device is a TCP packet sent by the server, in which the "Sequence Number" field value in the TCP header is 14481, indicating that the sequence number of the first byte of its packet payload is 14481.

A second packet is a TCP packet sent by the server, in which the "Sequence Number" field value in the TCP header is 15929, indicating that the sequence number of the first byte of its packet payload is 15529. The "Sequence Number" in the TCP header is calculated as follows: add the "Sequence Number" field value of a TCP packet previously sent by the server via that TCP connection to the number of bytes sent in the previous TCP packet payload to obtain the "Sequence Number" in the TCP header of current packet, i.e., 14481+1448=15929.

Suppose the "Sequence Number" field value in the TCP header of the second packet is 17377, indicating that the sequence number of the first byte of its packet payload is 17377. Because the "Sequence Number" field value in the TCP header of the previous TCP packet is 14481, and the byte number of its TCP packet payload is 1448, the "Sequence Number" field value in the TCP header of the second packet should be 15929 but not 17377. When this occurs, it indicates the loss of the second packet (i.e., the TCP packet having "Sequence Number" 15929 in its TCP header) sent by the server.

A third packet is a TCP ACK packet sent by the client, in which the "Sequence Number" field value in the TCP header is 15929, indicating that the "Sequence Number" field value of the next packet that is expected by this packet from the server is 15929. This TCP ACK packet sent by the client represents that the first packet has been successfully received by the client (i.e., all packet data having "Sequence Number" values smaller than 15929 sent from the server have been received). This is a response from the client that is sent after the reception of the first packet.

Suppose the "Acknowledge Number" field value in the TCP header of the third packet is 14481, indicating the "Sequence Number" field value of the next packet that is expected by this packet from the server is 14481. The "Sequence Number" field value of the second packet sent from the server is 15929, and the TCP ACK packet sent from the client indicates that the client wants to receive the first packet, in other words, the first packet has not been successfully received by the client. When this occurs, it indicates the loss of the first packet sent from the server.

One Embodiment

It has been found by the inventors from their research that TCP packet retransmission is one aspect that causes aggravated network congestion and lowered network resource utilization ratio. Particularly, when a TCP packet is lost during network congestion, the forwarding device sent a received TCP ACK packet from the client to the server, and the server searches for a TCP packet to be retransmitted as requested in the TCP ACK packet, and then sends the TCP packet to the client via the forwarding device, resulting to further aggravated network congestion and lowered network resource utilization ratio.

Figure 1:
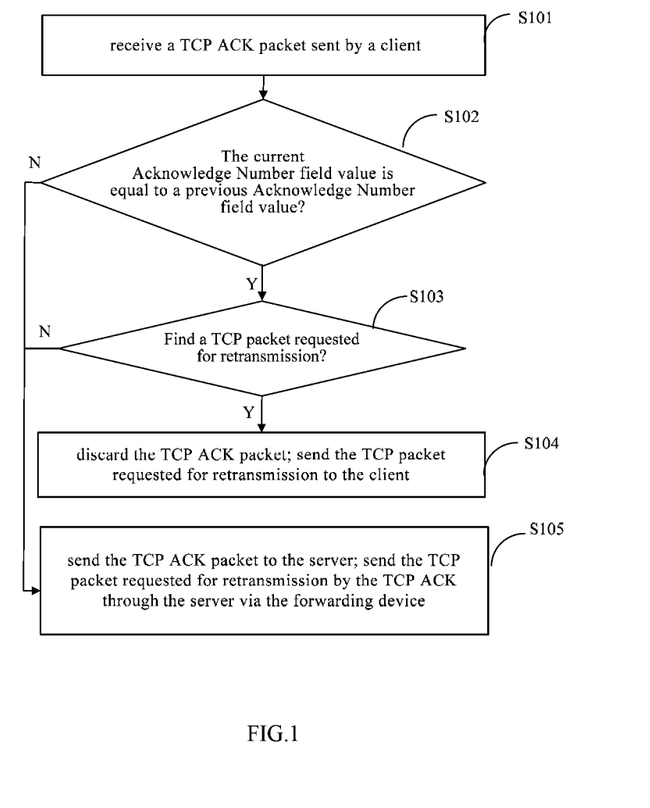
FIG. 1 is a flowchart of a packet handling method provided in an embodiment of this invention.

In order to solve the above problem, a packet handling method is provided in this embodiment of the invention. The forwarding device stores received TCP packets in a storage device—buffer memory. When a TCP packet is lost during downstream network congestion, the forwarding device may try to obtain from its buffer a TCP packet to be retransmitted as requested in a TCP ACK packet from the client. If the TCP packet requested for retransmission is obtained in the buffer, the forwarding device may directly send the TCP packet requested for retransmission, which may save bandwidth between the server and the forwarding device, and improve bandwidth utilization ratio and reduce network congestion. Refer to FIG. 1 for the flowchart of this method, comprising:

S101: receive a TCP ACK packet sent from a client.

The TCP ACK packet is sent from a client to a forwarding device, and then is sent to a server by the forwarding device, indicating that a TCP packet sent from the server has been received by the client. When the ACK field value in the Control Bits field in the TCP header of the packet received by the forwarding device is set to 1, it indicates that the received packet is a TCP ACK packet.

S102: determine whether the Acknowledge Number field value in the TCP header of the TCP ACK packet currently sent is equal to the Acknowledge Number field value in the TCP header of a TCP ACK packet previously sent by the client; if so, step S103 is executed; otherwise, step S105 is executed.

Because a server may establish multiple TCP connections to multiple clients, that is, the forwarding device may receive at the same time TCP ACK packets sent from multiple clients, step S102 should analyze TCP ACK packets sent in the same TCP connection by the same client. TCP connection between the server and the client are uniquely identified by source IP address, destination IP address, protocol type, TCP source port, and TCP destination port in the TCP headers of the packets sent by the server and the client, and different TCP connections have one or more different filed value of source IP address, destination IP address, protocol type, TCP source port, and TCP destination port field values. Thus, by analyzing the field value of the source IP address, destination IP address, protocol type, TCP source port, and TCP destination port fields in TCP headers of the packet, it can be recognized whether TCP ACK packets are sent from the same client to the same TCP connection.

When determining at step S102 whether the Acknowledge Number field value in the TCP header of the TCP ACK packet currently sent is equal to the Acknowledge Number field value in the TCP header of a TCP ACK packet previously sent by the client, the Acknowledge Number field value in the TCP header of the TCP ACK packet currently sent and the Acknowledge Number field value in the TCP header of the TCP ACK packet previously sent by the same client may be determined.

The forwarding device may further store in a list Acknowledge Number field values in TCP headers of TCP ACK packets received every time which are sent by the client to the same TCP connection, and determine the Acknowledge Number field value in the TCP header of the TCP ACK packet currently sent and the stored Acknowledge Number field values. When the Acknowledge Number field value in the TCP header of the TCP ACK packet currently sent is equal to at least one of the stored Acknowledge Number field values, it is determined that the Acknowledge Number field value in the TCP header of the TCP ACK packet currently sent is equal to the stored Acknowledge Number field value; otherwise, it is determined that the Acknowledge Number field value in the TCP header of the TCP ACK packet currently sent differs from the stored Acknowledge Number field values.

Certainly, the forwarding device may further store TCP ACK packets received every time which are sent by the client in the same TCP connection, analyze the stored TCP ACK packets and the TCP ACK packet currently received to acquire their Acknowledge Number field values respectively to make the decision. When the Acknowledge Number field value in the TCP header of the TCP ACK packet currently sent is equal to at least one of the stored Acknowledge Number field values, it is determined that the Acknowledge Number field value in the TCP header of the TCP ACK packet currently sent is equal to the stored Acknowledge Number field value. Otherwise, it is determined that the Acknowledge Number field value in the TCP header of the TCP ACK packet currently sent differs from the stored Acknowledge Number field values.

S103: determine whether a TCP packet to be retransmitted as required by the TCP ACK packet can be found in the buffer; if so, step S104 is executed; otherwise, step S105 is executed. Wherein, the buffer is embedded into the forwarding device or is externally attached to the forwarding device.

S104: discard the TCP ACK packet from the client, and send the TCP packet requested for retransmission, i.e., the found TCP packet, to the client.

S105: send a TCP ACK packet to the server, and send by the server the TCP packet to be transmitted as requested by the TCP ACK packet to the client via the forwarding device.

Below, the present invention will be illustrated with an example in which packets are transmitted between a server having an IP address 192.168.0.198 and a client having an IP address 192.168.0.9 via a forwarding device, wherein the size of the packets sent by the server is 1400 bytes.

The first packet received by the forwarding device is a TCP packet sent by the server, in which the "Sequence Number" field value in the TCP header is 14000, indicating that the sequence number of the first byte of its packet payload is 14000.

The second packet is a TCP packet sent by the server, in which the "Sequence Number" field value in the TCP header is 15400, indicating that the sequence number of the first byte of its packet payload is 15400.

The third packet is a TCP ACK packet sent by the client, in which the "Acknowledge Number" field value in the TCP header is 15400, indicating that the "Sequence Number" field value of the next packet to be sent as expected by this packet is 15400. This TCP ACK packet sent by the client indicates that the first packet has been received successfully by the client. This is a response that is sent after the first packet has been received.

The fourth packet is a TCP ACK packet sent by the client, in which the "Acknowledge Number" field value in the TCP header is 15400, indicating that the "Sequence Number" field value of the next packet to be sent as expected by this packet is still 15400, that is, the client fails to receive the second packet.

The forwarding device compares the Acknowledge Number field value in the TCP header of the fourth packet with the Acknowledge Number field value in the TCP header of the third packet, and determines that the Acknowledge Number field values in the TCP headers of the third and fourth packets are the same, indicating that the client fails to receive the second packet sent by the server successfully. The forwarding device tries to obtain in its buffer a packet with "Sequence Number" field value 15400, i.e., the second packet to be retransmitted as requested by the fourth packet. If the forwarding device finds the second packet in its buffer, the forwarding device directly sends the obtained second packet to the client. If the second packet is lost when it is sent to the forwarding device from the server to the forwarding device, the forwarding device cannot find the second packet in its buffer, in which case the forwarding device sends the fourth packet to the server, and the server sends the packet to be retransmitted as requested by the fourth packet, in which "Sequence Number" field value is 15400, i.e., the second packet to the client via the forwarding device.

With the above technical solution, after receiving a TCP ACK packet, the forwarding device determines that the Acknowledge Number field value in the TCP header of the TCP ACK packet currently sent is equal to the Acknowledge Number field value in the TCP header of the TCP ACK packet previously sent by the client in the same TCP connection, and then the forwarding device searches in a storage device for a TCP packet to be retransmitted as requested by the TCP ACK packet; when TCP packet to be retransmitted as requested by the TCP ACK packet is found in the storage device, the forwarding device sends the TCP packet to the client. In comparison to the prior art, where a TCP packet at anytime is directly transmitted from a server to the client via the forwarding device, bandwidth between the server and the forwarding device can be saved, and bandwidth utilization ratio can be improved, thereby leading to reduced network congestion and increased network resource utilization ratio.

Another Embodiment

Another aspect of the existing packet handling methods that may cause aggravated network congestion and lowered network resource utilization ratio is: congestion window cwnd is disabled by the server, and the size of the sent TCP packets is not assigned according to the receiving window of the client. It has been recognized by the inventors from their experiences that, when congestion window cwnd is disabled on the server, according to the method in which the receiving window controls the size of TCP packets that are sent by the server, the size of sent TCP packets at the time of network congestion is reduced, which can reduce network congestion and improve network resource utilization ratio.

Figure 2:
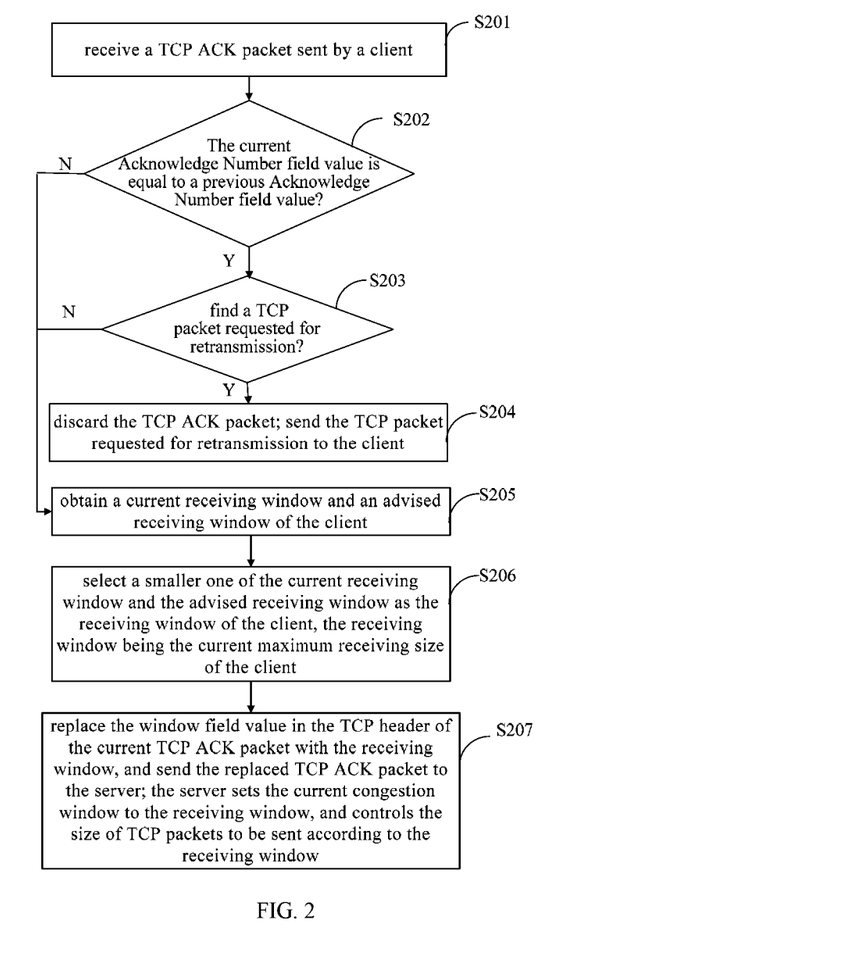
FIG. 2 is another flowchart of a packet handling method provided in an embodiment of this invention.

In order to achieve the above object, referring to FIG. 2, another flowchart of the packet handling method provided in an embodiment of this invention comprises:

S201: receive a TCP ACK packet sent by a client.

The TCP ACK packet is sent from a client to a forwarding device, and then is sent to a server by the forwarding device, indicating that a TCP packet sent from the server has been received by the client. When the ACK field value in the Control Bits field in the TCP header of the packet received by the forwarding device is set to 1, it indicates that the received packet is a TCP ACK packet.

S202: determine whether the Acknowledge Number field value in the TCP header of the TCP ACK packet currently sent is a repetitive field value; if so, step S203 is executed, otherwise step S205 is executed.

Because a server may establish multiple TCP connections to multiple clients, that is, the forwarding device may receive at the same time TCP ACK packets sent from multiple clients, step S202 should analyze TCP ACK packets sent in the same TCP connection by the same client. TCP connections between the server and the client are uniquely identified by source IP address, destination IP address, protocol type, TCP source port, and TCP destination port in the TCP headers of the packets sent by the server and the client, and different TCP connections have one or more different filed value of source IP address, destination IP address, protocol type, TCP source port, and TCP destination port field values. Thus, by analyzing the field value of the source IP address, destination IP address, protocol type, TCP source port, and TCP destination port fields in TCP headers of the packet, it can be recognized whether TCP ACK packets are sent from the same client over the same TCP connection.

When determining at step S202 whether the Acknowledge Number field value in the TCP header of the TCP ACK packet currently sent is equal to the Acknowledge Number field value in the TCP header of a TCP ACK packet previously sent by the client, the Acknowledge Number field value in the TCP header of the TCP ACK packet currently sent and the Acknowledge Number field value in the TCP header of a TCP ACK packet previously sent by the client may be determined.

The forwarding device may further store in a list Acknowledge Number field values in TCP headers of TCP ACK packets received every time which are sent by the client to the same TCP connection, and determine the Acknowledge Number field value in the TCP header of the TCP ACK packet currently sent and the stored Acknowledge Number field values. When the Acknowledge Number field value in the TCP header of the TCP ACK packet currently sent is equal to at least one of the stored Acknowledge Number field values, it is determined that the Acknowledge Number field value in the TCP header of the TCP ACK packet currently sent is equal to the stored Acknowledge Number field value; otherwise, it is determined that the Acknowledge Number field value in the TCP header of the TCP ACK packet currently sent differs from the stored Acknowledge Number field values.

Certainly, the forwarding device may further store TCP ACK packets received every time which are sent by the client in the same TCP connection, analyze the stored TCP ACK packets and the currently received TCP ACK packet to acquire their Acknowledge Number field values respectively to make the decision. When the Acknowledge Number field value in the TCP header of the TCP ACK packet currently sent is equal to at least one of the stored Acknowledge Number field values, it is determined that the Acknowledge Number field value in the TCP header of the TCP ACK packet currently sent is equal to the stored Acknowledge Number field value. Otherwise, it is determined that the Acknowledge Number field value in the TCP header of the TCP ACK packet currently sent differs from the stored Acknowledge Number field values.

S203: determine whether a TCP packet to be retransmitted as required by the TCP ACK packet can be found in the buffer; if so, step S204 is executed; otherwise, step S205 is executed. Wherein, the buffer is embedded into the forwarding device or is externally attached to the forwarding device.

S204: discard the TCP ACK packet, and send the TCP packet requested for retransmission, i.e., the found TCP packet, to the client.

S205: obtain a current receiving window and an advised receiving window of the client, wherein, the window field value in the TCP header of a TCP ACK packet is the receiving window. Therefore, after receiving the TCP ACK packet, the TCP ACK packet is analyzed to obtain the window field value in the TCP header of the TCP ACK packet, which is the current receiving window of the client from which the TCP ACK packet is sent.

The advised receiving window of the client may be acquired through three manners. These three manners will be introduced below.

First manner: set the advised receiving window according to a preset window threshold, particularly by setting the advised receiving window to 0, or reducing the current receiving window, for example, by multiplying the value of the current receiving window with a predetermined coefficient less than 1 and using its product as the advised receiving window.

Second manner: when the TCP ACK packet is a downstream packet, i.e., the packet is transmitted from the server to the client, an upstream bandwidth BD and a packet round-trip time T are obtained, and a calculation result is obtained as the advised window of the client following an equation: receiving window R=BD*T*TH, wherein, R is in byte, BD in Mbps, and T is a time length in ms (millisecond) between a timing at which a TCP packet reaches the client and a timing at which the TCP ACK packet responding to the TCP packet reaches the server, which can be obtained by querying the timestamp field in the TCP header of the TCP packet. TH is a first preset multiplier threshold, which differs depending on different situations. Particularly, suppose that $BD=2$ Mbps, $T=500$ ms and $TH=120$, thus $R=2*10^6*500*10^{-3}*120/8=1.5*10^7$ bytes.

The upstream bandwidth BD is an upstream line bandwidth or an upstream session bandwidth or an adjusted upstream packet bandwidth, wherein, the upstream line bandwidth can be the access bandwidth of the client, such as 2 Mbps bandwidth provided for the client by a carrier. The upstream session bandwidth can be video media traffic or a constant bit rate, such as the constant bit rate of a video that is watched currently by a user.

The adjusted upstream packet bandwidth is an upstream packet bandwidth obtained by readjusting the bandwidths of multiple upstream packets transmitted in an upstream session according to some criteria. For instance, there are three upstream packets transmitted in an upstream session, upstream packet A with 2 Mbps bandwidth, upstream packet B with 3 Mbps bandwidth, and upstream packet C with 4 Mbps bandwidth. Readjusting the bandwidths of those packets according to the principle of even distribution of bandwidth, the bandwidth of these three packets is 3 Mbps. Thus, the upstream bandwidth BD is 3 Mbps when calculating an advised window of the client for receiving upstream packet A. Certainly, upstream packet bandwidth can be increased by a value, such as 1 Mbps based on its original bandwidth.

Third manner: when the TCP ACK packet is an upstream packet, i.e., the packet is transmitted from the server to the client, an upstream bandwidth BD and a packet round-trip time T are obtained, and a calculation result is obtained as the advised window of the client following an equation: receiving window R=BD*T*TH, wherein, R is in byte, BD in Mbps, and T is a time length in ms between a timing at which a TCP packet reaches the client and a timing at which a TCP ACK packet reaches the server, which can be obtained by querying the timestamp field in the TCP header of the TCP packet. TH is a second preset multiplier threshold, which differs depending on different situations. Particularly, suppose that $BD=4$ Mbps, $T=400$ ms and $TH=100$, thus $R=4*10^6*400*10^{-3}*100/8=2*10^7$ bytes.

The downstream bandwidth BD is a downstream line bandwidth or a downstream session bandwidth or an adjusted downstream packet bandwidth, wherein, the downstream line bandwidth can be the access bandwidth of the client, such as 6 Mbps bandwidth provided for the client by a carrier. The downstream session bandwidth can be video media traffic or a constant bit rate, such as the constant bit rate of a video that is watched currently by a user.

The adjusted downstream packet bandwidth is a downstream packet bandwidth obtained by readjusting the bandwidths of multiple downstream packets transmitted in a downstream session according to some criteria. For instance, there are three downstream packets transmitted in a downstream session, downstream packet A with 2 Mbps bandwidth, downstream packet B with 3 Mbps bandwidth, and downstream packet C with 4 Mbps bandwidth. Readjusting the bandwidths of those packets according to the principle of even distribution of bandwidth, the bandwidth of these three downstream packets is 3 Mbps. Thus, the downstream bandwidth BD is 3 Mbps when calculating an advised window of the client for receiving downstream packet A. Certainly, downstream packet bandwidth can be increased by a value, such as 1 Mbps based on its original bandwidth.

S206: select a smaller one of the current receiving window and the advised receiving window as the new receiving window of the client, wherein the receiving window is the current maximum receiving size of the client.

S207: replace the window field value in TCP header of the TCP ACK packet with the new receiving window, and send the replaced TCP ACK packet to the server. The server sets its current congestion window cwnd to the receiving window, and controls the size of TCP packets to be sent according to the current congestion window.

Note that the checksum field value of the TCP ACK packet is a checksum calculated based on all fields in the TCP ACK packet. Thus, after replacing the window field value, it is necessary to re-calculate and replace the original the checksum field value to ensure the effective transmission of the TCP ACK packet.

With the above technical solution, when the Acknowledge Number field value in the TCP header of the TCP ACK packet currently sent differs from the Acknowledge Number field value in the TCP header of the TCP ACK packet previously sent by the client in the same TCP connection, or when a TCP packet requested for retransmission by the TCP ACK packet is found in the storage device, the current receiving window and the advised receiving window of the client are obtained; one of them having a smaller size is selected as the new receiving window of the client, the window field value in the TCP ACK packet is replaced with the new receiving window, and the replaced TCP ACK packet is sent to the server. The server receives the replaced TCP ACK packet, and uses the receiving window in the TCP ACK packet as the maximum number of bytes that can be transmitted in a TCP packet under the control of the server. In comparison to the prior art, the embodiment of this invention reduce the maximum number of bytes in a TCP packet that is sent by the server by decreasing the receiving window of the client, thereby leading to reduced network congestion and increased network resource utilization ratio.

The embodiments in the present specification are described in a progressive manner. For the same or similar parts of various embodiments, reference may be made among the embodiments. Each embodiment focuses on the difference from other embodiments. From the description of the above method embodiments, those skilled in the art can clearly understand that the invention can be implemented in a manner of software plus an essential general-purpose hardware platform. Certainly, this invention can be implemented in hardware, but the former is preferred in most cases. Based upon such understanding, the technical solutions of the invention or a part thereof contributing to the prior art can essentially be embodied in the form of a software product, which can be stored in a storage medium, including several instructions to cause a computer forwarding device (which can be a personal computer, a server, a network forwarding device, etc.) to perform all or a part of steps in the methods according to the respective embodiments of the invention. The storage medium described above comprises ROM, RAM, magnetic disk, optical disk, and other media that can store program code.

Figure 3:
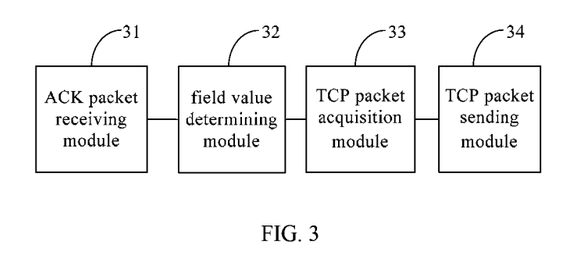
FIG. 3 is a schematic structural diagram of a forwarding device provided in an embodiment of this invention.

Corresponding to the above method embodiments, a forwarding device is further provided in an embodiment of this invention, the structure of which is shown in FIG. 3, comprising: an ACK packet receiving module 31, a field value determining module 32, a TCP packet acquisition module 33 and a TCP packet sending module 34, wherein, the ACK packet receiving module 31 is used to receive a TCP ACK packet currently sent by a client.

The field value determining module 32 is used to determine the Acknowledge Number field value in the TCP header of the TCP ACK packet currently sent by the client and the Acknowledge Number field value in the TCP header of a TCP ACK packet that is previously sent by the client in the same TCP connection.

The TCP packet searching module 33 is used to search in a storage device for a TCP packet requested for retransmission by the TCP ACK packet when the Acknowledge Number field value in the TCP header of the TCP ACK packet currently sent by the client is equal to the Acknowledge Number field value in the TCP header of a TCP ACK packet that is previously sent by the client in the same TCP connection. The storage device is a buffer. The buffer can be embedded in the forwarding device or may be attached to the forwarding device externally.

The TCP packet sending module 34 is used to discard the TCP ACK packet and send the TCP packet requested for retransmission to the client sending the TCP ACK packet when the TCP packet requested for retransmission by the TCP ACK packet is found in the storage device.

Figure 4:
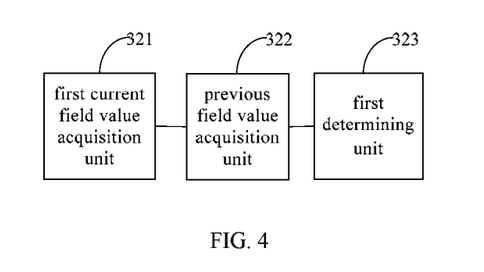
FIG. 4 is a schematic structural diagram of the field value determining module in the forwarding device.

The above field value determining module 32 can make judgment based on the Acknowledge Number field value in the TCP header of a TCP ACK packet that is previously sent by the client. Thus, the field value determining module 32 comprises: a first current field value acquisition unit 321, a previous field value acquisition unit 322, and a first determining unit 323. Refer to FIG. 4 in which a schematic structural diagram is shown, wherein:

The first current field value acquisition unit 321 is used to analyze the current TCP ACK packet, and obtain the Acknowledge Number field value in the TCP header of the TCP ACK packet as the current Acknowledge Number field value.

The previous field value acquisition unit 322 is used to analyze a TCP ACK packet previously sent by the client sending the current TCP ACK packet, in the same TCP connection, and obtain the Acknowledge Number field value in the TCP header of the TCP ACK packet as the previous Acknowledge Number field value.

The first determining unit 323 is used to determine whether the current Acknowledge Number field value is equal to the previous Acknowledge Number field value.

Figure 5:
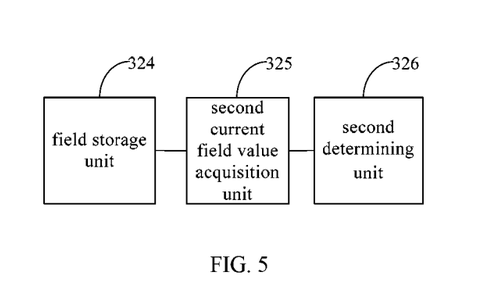
FIG. 5 is another schematic structural diagram of the field value determining module in the forwarding device.

The field value determining module 32 can further store the Acknowledge Number field value in the TCP header of every received TCP ACK packet that is sent by the client in the same TCP connection, and determine the Acknowledge Number field value in the TCP header of the TCP ACK packet currently sent and the previously stored Acknowledge Number field values. Its structure is shown in FIG. 5, comprising: a field storage unit 324, a second current field value acquisition unit 325, and a second determining unit 326, wherein:

The field storage unit 324 is used to store the Acknowledge Number field value in the TCP header of every received TCP ACK packet that is sent by client in the same TCP connection.

The second current field value acquisition unit 325 is used to analyze the current TCP ACK packet, and obtain the Acknowledge Number field value in the TCP header of the TCP ACK packet as the current Acknowledge Number field value.

The second determining unit 326 is used to determine whether the current Acknowledge Number field value is equal to a stored Acknowledge Number field value. When the current Acknowledge Number field value is equal to at least one of the stored Acknowledge Number field values, it is determined that the current Acknowledge Number field value is equal to a stored Acknowledge Number field value; otherwise, it is determined that the current Acknowledge Number field value differs from the stored Acknowledge Number field values.

Figure 6:
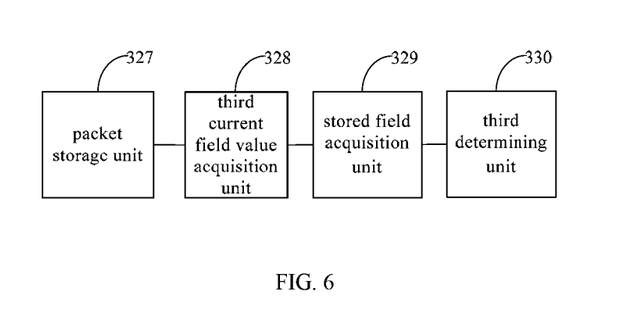
FIG. 6 is still another schematic structural diagram of the field value determining module in the forwarding device.

Certainly, the forwarding device can further store every received TCP ACK packets that is sent by the client in the same TCP connection; analyze the stored TCP ACK packets and the TCP ACK packet currently received respectively, to acquire their Acknowledge Number field values for determination. The structure of the field value determining module is shown in FIG. 6, comprising: a packet storage unit 327, a third current field value acquisition unit 328, a stored field acquisition unit 329 and a third determining unit 330, wherein:

The packet storage unit 327 is used to store every received TCP ACK packet that is sent by the client in the same TCP connection.

The third current field value acquisition unit 328 is used to analyze the current TCP ACK packet, and obtain the Acknowledge Number field value in the TCP header of the TCP ACK packet as the current Acknowledge Number field value.

The stored field acquisition unit 329 is used to analyze the stored TCP ACK packets to obtain the Acknowledge Number field values in the TCP headers of the stored TCP ACK packets as the stored Acknowledge Number field values.

The third determining unit 330 is used to determine whether the current Acknowledge Number field value is equal to a stored Acknowledge Number field value. When the current Acknowledge Number field value is equal to at least one of the stored Acknowledge Number field values, it is determined that the current Acknowledge Number field value is equal to a stored Acknowledge Number field value; otherwise, it is determined that the current Acknowledge Number field value differs from the stored Acknowledge Number field values.

Another aspect of the existing packet handling methods that may cause aggravated network congestion and lowered network resource utilization ratio is: congestion window cwnd is disabled by the server, and the size of the sent TCP packets is not assigned according to the receiving window of the client. It has been recognized by the inventors from their experiences that, when congestion window cwnd is disabled on the server, according to the method in which the receiving window controls the size of TCP packets that are sent by the server, the size of sent TCP packets at the time of network congestion is reduced, which can reduce network congestion and improve network resource utilization ratio.

Figure 7:
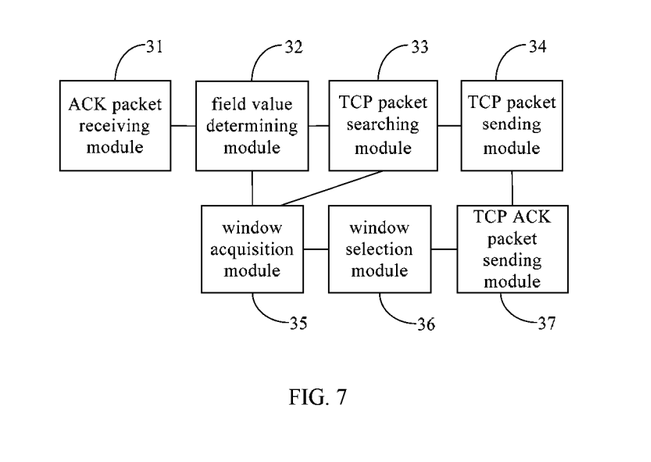
FIG. 7 is another schematic structural diagram of the forwarding device provided in an embodiment of this invention.

In order to achieve the above object, a forwarding device is provided in an embodiment of this invention, on the basis of FIG. 3, further comprising: a window acquisition module 35, a window selection module 36, and a TCP ACK packet sending module 37, as shown in FIG. 7, wherein:

The window acquisition module 35 is used to obtain the current receiving window and an advised receiving window of the client sending the current TCP ACK packet when it is determined that the Acknowledge Number field value in the TCP header of the currently sent TCP ACK packet differs from the Acknowledge Number field values in the TCP headers of the TCP ACK packets that are previously sent by the client in the same TCP connection, or when a TCP packet requested for retransmission by the TCP ACK packet currently received is not found in the storage device.

The window selection module 36 is used to select a smaller one of the current receiving window and the advised receiving window as the new receiving window of the client sending the current TCP ACK packet, wherein the receiving window indicates the current maximum receiving size of the client sending the current TCP ACK packet.

The TCP ACK packet sending module 37 is used to replace the window field value in the TCP header of the current TCP ACK packet with the receiving window, and send the replaced TCP ACK packet to the server. The server controls the size of TCP packets to be sent based on the receiving window.

Note that the checksum field value of the TCP ACK packet is a checksum calculated based on all fields in the TCP ACK packet. Thus, after replacing the window field value, it is necessary to re-calculate and replace the original the checksum field value to ensure the effective transmission of the TCP ACK packet.

Figure 8:
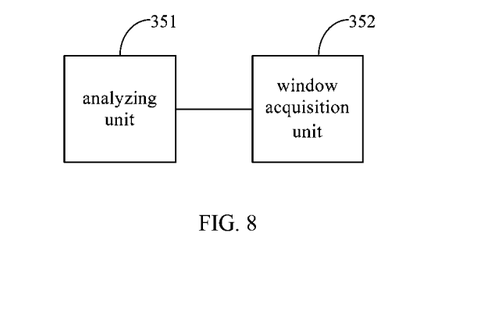
FIG. 8 is a schematic structural diagram of the window acquisition module in the forwarding device.

Refer FIG. 8 for the structure of the window acquisition module 35, comprising an analyzing unit 351 and a window acquisition unit 352, wherein:

The analyzing unit 351 is used to analyze the received TCP ACK packet currently sent by the client;

The window acquisition unit 352 is used to obtain the window field value in the TCP header of the TCP ACK packet, wherein the window field value is the current receiving window of the client sending the current TCP ACK packet.

Figure 9:
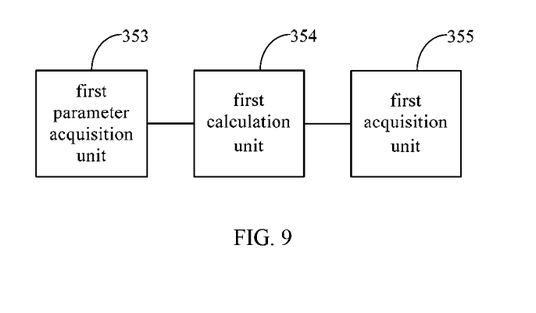
FIG. 9 is another schematic structural diagram of the window acquisition module in the forwarding device.
Figure 10:
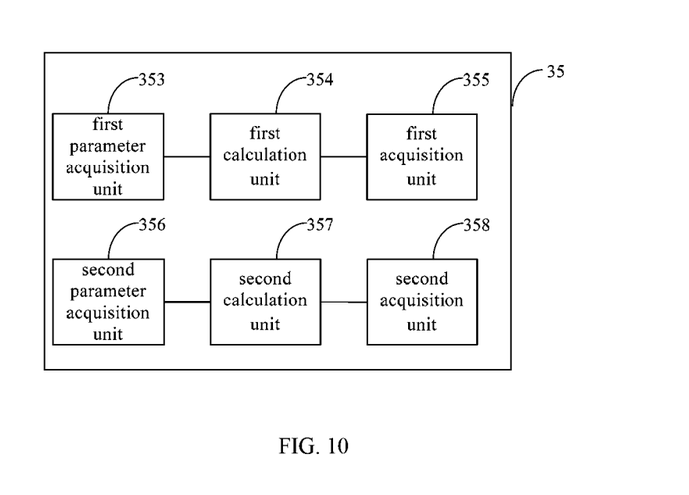
FIG. 10 is still another schematic structural diagram of the window acquisition module in the forwarding device.

When the current TCP ACK packet is a downstream packet, in order to obtain the advised receiving window of the client, on the basis of FIG. 9, the window acquisition module 35 further comprises: a first parameter acquisition unit 353, a first calculation unit 354 and a first acquisition unit 355, as shown in FIG. 10, wherein:

The first parameter acquisition unit 353 is used to obtain an upstream bandwidth BD and a packet round-trip time T when the current TCP ACK packet is a downstream packet, wherein the upstream bandwidth BD is upstream line bandwidth or upstream session bandwidth or adjusted upstream packet bandwidth.

The first calculation unit 354 is used to calculate the product of the upstream bandwidth BD and the packet round-trip time T to obtain a multiplication result.

The first acquisition unit 355 is used to obtain the product of the multiplication result and a first preset multiplier threshold, and use the product of the multiplication result and a first preset multiplier threshold as the advised receiving window of the client sending the current TCP ACK packet.

When the current TCP ACK packet is an upstream packet, in order to obtain the advised receiving window of the client, on the basis of FIG. 9, the window acquisition module 35 further comprises: a second parameter acquisition unit 356, a second calculation unit 357, and a second acquisition unit 358, as shown in FIG. 10, wherein:

The second parameter acquisition unit 356 is used to obtain a downstream bandwidth BD and a packet round-trip time T when the current TCP ACK packet is an upstream packet, wherein, the downstream bandwidth BD is downstream line bandwidth or downstream session bandwidth or adjusted downstream packet bandwidth.

The second calculation unit 357 is used to calculate the product of the downstream bandwidth BD and the packet round-trip time T to obtain a multiplication result.

The second acquisition unit 358 is used to obtain the product of the multiplication result and a second preset multiplier threshold as the advised receiving window of the client sending the current TCP ACK packet.

The forwarding device is implemented with a variety of units as illustrated above. Alternatively, the forwarding device can also be implemented with a control device, which comprises a memory storing instructions thereon and a processor, where processor coupled to the memory and implements the instructions to receive a TCP ACK packet currently sent by a client, to determine the Acknowledge Number field value in the TCP header of the TCP ACK packet currently sent by the client and the Acknowledge Number field value in the TCP header of a TCP ACK packet previously sent by the client in the same TCP connection, to search in a storage device for a TCP packet requested for retransmission the by TCP ACK packet when it is determined that the Acknowledge Number field value in the TCP header of the TCP ACK packet currently sent by the client is equal to the Acknowledge Number field value in the TCP header of the TCP ACK packet previously sent by the client in the same TCP connection, and to discard the TCP ACK packet and transmitting the TCP packet to the client sending the TCP ACK packet when the TCP packet requested for retransmission is found in the storage device.

Corresponding to the above apparatus embodiment, a packet handling system is further provided in an embodiment of this invention, comprising a client, a server and a forwarding device, packets being transmitted between the client and the server via the forwarding device, wherein the forwarding device is used to receive a TCP ACK packet currently sent by a client, obtain a TCP packet requested or retransmission by the TCP ACK packet when it is determined that the Acknowledge Number field value in the TCP header of the TCP ACK packet currently sent by the client is equal to the Acknowledge Number field value in the TCP header of a TCP ACK packet previously sent by the client in the same TCP connection, and discard the TCP ACK packet and send the TCP packet to the client from which the TCP ACK packet was sent when the TCP packet requested for retransmission by the TCP ACK packet is found in the storage device.

The forwarding device is further used to, when it is determined that the Acknowledge Number field value in the TCP header of the TCP ACK packet currently sent differs from the Acknowledge Number field value in the TCP header of a TCP ACK packet previously sent by the client in the same TCP connection, or when a TCP packet requested for retransmission by the TCP ACK packet is not found in the storage device, obtain a current receiving window and an advised receiving window of the client; select a smaller one of the current receiving window and the advised receiving window as the new receiving window of the client, wherein the receiving window is the current maximum receiving size of the client sending the current TCP ACK packet; replace the window field value in the TCP ACK packet with the window field value in the current TCP ACK packet, and send the replaced TCP ACK packet to the server. The server controls the size of TCP packets to be sent according to the receiving window.

The above apparatus embodiment and the system embodiment may adopt the packet handling method provided in the above method embodiment to address the problem in the prior art, that is, disabling congestion window cwnd in the server may cause it impossible to adjust the number of bytes the server may send according to network congestion situations, which may lead to aggravated network congestion and lowered network resource utilization ratio.

As to the apparatus embodiment, because it substantially corresponds to the method embodiment, for the related parts thereof, reference can be made to the method embodiment. The apparatus embodiment described above is merely illustrative, in which elements that are described as separated parts can be or cannot be physically separated from each other, and those ones shown individually can be or cannot be physical elements, which may be positioned at one location or may be distributed over multiple network units. Some or all modules thereof can be selected as required to realize the object of the embodiments of this invention as can be understood and implemented by those skilled in the art without any creative effort.

From the embodiments provided in this invention, it may be understood that the apparatus and method disclosed herein, without departing from the spirit and scope of this invention, can be realized in other manners. The present embodiments are merely illustrative examples, but not limitation, and the particular contents given herein should not be conceived as limitation to this application. For example, the unit or subunit division is merely a logical function division, and other division manners are also possible in practical implementations, such as multiple units or subunits may be combined together. Further, multiple elements or components may be combined into or integrated into another system, or some features may be omitted or not be executed.

The above description is merely particular embodiments of this invention. It should be noted that many variations and modifications can be made by those skilled in the art without departing from the principle of this invention, which should be construed as falling within the scope of this invention.

What is claimed is:

1. A packet handling method, comprising:
   receiving, by a forwarding device, a TCP ACK packet sent by a client via a TCP connection;
   determining, by the forwarding device, that an Acknowledge Number field value in the TCP header of the TCP ACK packet sent by the client is equal to an Acknowledge Number field value in the TCP header of a TCP ACK packet previously sent by the client via the same TCP connection;
   searching, in response to the determining, in a storage device for a TCP packet for retransmission based on the TCP ACK packet sent by the client; and
   discarding the TCP ACK packet sent by the client and transmitting the TCP packet for retransmission to the client in response to finding the TCP packet for retransmission in the storage device;
   determining, by the forwarding device:
   (a) that the Acknowledge Number field value in the TCP header of the TCP ACK packet sent by the client differs from the Acknowledge Number field value in the TCP header of a TCP ACK packet previously sent by the client via the same TCP connection, or
   (b) that the Acknowledge Number field value in the TCP header of the TCP ACK packet sent by the client is equal to the Acknowledge Number field value in the TCP header of a TCP ACK packet previously sent by the client via the same TCP connection, and a TCP packet for retransmission based on the TCP ACK packet sent by the client is not stored at the forwarding device;
   obtaining, in response to determining (a) or (b), a current receiving window and an advised receiving window of the client;
   selecting a smaller one of the current receiving window and the advised receiving window as the new receiving window of the client, the receiving window being a current maximum receiving size of the client; and
   replacing the window field value in TCP header of the TCP ACK packet sent by the client with the new receiving window, and sending the TCP ACK packet with the replaced window field value to a server so as to enable the server to control the size of TCP packets to be sent to the client according to the new receiving window.

2. The packet handling method according to claim 1, wherein the TCP ACK packet sent by the client and the TCP ACK packet previously sent by the client are consecutively sent TCP ACK packets.

3. The packet handling method according to claim 1, wherein a plurality of Acknowledge Number field values from the TCP headers of TCP ACK packets previously sent by the client via the same TCP connection are stored.

4. The packet handling method according to claim 3, wherein the plurality of TCP ACK packets previously sent by the client via the same TCP Connection corresponding to the plurality of Acknowledge Number field values are stored.

5. A packet handling method, comprising:
   receiving, by a forwarding device, a TCP ACK packet sent by a client via a TCP connection;
   determining, by the forwarding device:
   (a) that the Acknowledge Number field value in the TCP header of the TCP ACK packet sent by the client differs from the Acknowledge Number field value in the TCP header of a TCP ACK packet previously sent by the client via the same TCP connection, or
   (b) that the Acknowledge Number field value in the TCP header of the TCP ACK packet sent by the client is equal to the Acknowledge Number field value in the TCP header of a TCP ACK packet previously sent by the client via the same TCP connection, and a TCP packet for retransmission based on the TCP ACK packet sent by the client is not stored at the forwarding device;
   obtaining, in response to the determining, a current receiving window and an advised receiving window of the client;
   selecting a smaller one of the current receiving window and the advised receiving window as the new receiving window of the client, the receiving window being a current maximum receiving size of the client; and
   replacing the window field value in TCP header of the TCP ACK packet sent by the client with the new receiving window, and sending the TCP ACK packet with the replaced window field value to a server so as to enable the server to control the size of TCP packets to be sent to the client according to the new receiving window.

6. The packet handling method according to claim 5, wherein obtaining a current receiving window of the client comprises:
   analyzing the TCP ACK packet sent by the client; and
   obtaining the window field value in the TCP header of the TCP ACK packet sent by the client, wherein the window field value corresponds to the current receiving window of the client.

7. The packet handling method according to claim 5, wherein obtaining an advised receiving window of the client comprises:
setting the advised receiving window according to a preset window threshold.

8. The packet handling method according to claim 5, wherein obtaining an advised receiving window of the client comprises:
obtaining an upstream bandwidth BD and a round-trip time T when the TCP ACK packet sent by the client is a downstream packet;
calculating the product of the upstream bandwidth BD and the round-trip time T to obtain a multiplication result; and
obtaining the product of the multiplication result and a preset multiplier threshold, and using the product of the multiplication result and the preset multiplier threshold as the advised receiving window of the client.

9. The packet handling method according to claim 5, wherein obtaining an advised receiving window of the client comprises:
obtaining a downstream bandwidth BD and a round-trip time T when the TCP ACK packet sent by the client is an upstream packet;
calculating the product of the downstream bandwidth BD and the round-trip time T to get a multiplication result; and
obtaining the product of the multiplication result and a preset multiplier threshold, and using the product of the multiplication result and the preset multiplier threshold as the advised receiving window of the client.

10. A forwarding device, comprising:
a non-transitory memory having processor-executable instructions stored thereon; and
a processor coupled to the memory, configured to implement the processor-executable instructions to:
receive a TCP ACK packet sent by a client via a TCP connection;
determine that an Acknowledge Number field value in the TCP header of the TCP ACK packet sent by the client is equal to an Acknowledge Number field value in the TCP header of a TCP ACK packet previously sent by the client via the same TCP connection;
search, in response to the determining, a storage device for a TCP packet for retransmission based on the TCP ACK packet sent by the client; and
discard the TCP ACK packet sent by the client and transmit the TCP packet for retransmission to the client in response to finding the TCP packet for retransmission in the storage device;
determine: (a) that the Acknowledge Number field value in the TCP header of the TCP ACK packet sent by the client differs from the Acknowledge Number field value in the TCP header of a TCP ACK packet previously sent by the client via the same TCP connection, or (b) that a TCP packet for retransmission based on the TCP ACK packet sent by the client is not stored at the forwarding device, where the Acknowledge Number field value in the TCP header of the TCP ACK packet sent by the client is equal to the Acknowledge Number field value in the TCP header of a TCP ACK packet previously sent by the client via the same TCP connection;
obtain, in response to determining (a) or (b), a current receiving window and an advised receiving window of the client;
select a smaller one of the current receiving window and the advised receiving window as the new receiving window of the client, the receiving window being a current maximum receiving size of the client; and
replace the window field value in TCP header of the TCP ACK packet sent by the client with the new receiving window, and send the TCP ACK packet with the replaced window field value to a server.

11. The forwarding device according to claim 10, wherein determining that an Acknowledge Number field value in the TCP header of the TCP ACK packet sent by the client is equal to an Acknowledge Number field value in the TCP header of a TCP ACK packet previously sent by the client via the same TCP connection comprises:
analyzing the TCP ACK packet sent by the client, and obtaining the Acknowledge Number field value in the TCP header of the TCP ACK packet sent by the client;
analyzing the TCP ACK packet previously sent by the client, and obtaining the Acknowledge Number field value in the TCP header of the TCP ACK packet previously sent by the client;
determining that the Acknowledge Number field value of the TCP ACK packet sent by the client is equal to the Acknowledge Number field value of the TCP ACK packet previously sent by the client.

12. The forwarding device according to claim 10, wherein determining that an Acknowledge Number field value in the TCP header of the TCP ACK packet sent by the client is equal to an Acknowledge Number field value in the TCP header of a TCP ACK packet previously sent by the client via the same TCP connection comprises:
analyzing the TCP ACK packet sent by the client, and obtaining the Acknowledge Number field value in the TCP header of the TCP ACK packet sent by the client;
determining that the Acknowledge Number field value of the TCP ACK packet sent by the client is equal to a stored Acknowledge Number field value, wherein the stored Acknowledge Number field value is one of a plurality of stored Acknowledge Number field values from the TCP headers of TCP ACK packets previously sent by client via the same TCP connection.

13. The forwarding device according to claim 12, wherein the plurality of TCP ACK packets previously sent by the client via the same TCP connection corresponding to the plurality of stored Acknowledge Number field values are also stored, and wherein the determining further comprises: analyzing one or more of the plurality of stored TCP ACK packets, and obtaining the stored Acknowledge Number field value.

14. The forwarding device according to claim 10, wherein obtaining a current receiving window of the client comprises:
analyzing the TCP ACK packet sent by the client; and
obtaining the window field value in the TCP header of the TCP ACK packet sent by the client, the window field value corresponding to the current receiving window of the client.

15. The forwarding device according to claim 10, wherein obtaining an advised receiving window of the client comprises:
obtaining an upstream bandwidth BD and a packet round-trip time T when the TCP ACK packet sent by the client is a downstream packet;
calculating the product of the upstream bandwidth BD and the packet round-trip time T and obtaining a multiplication result; and
obtaining the product of the multiplication result and a preset multiplier threshold, and using the product of the multiplication result and a preset multiplier threshold as the advised receiving window of the client.

16. The forwarding device according to claim 10, wherein obtaining a current receiving window of the client comprises:
   obtaining a downstream bandwidth BD and a packet round-trip time T when the TCP ACK packet sent by the client is an upstream packet;
   calculating the product of the downstream bandwidth BD and the packet round-trip time T, and obtaining a multiplication result; and
   obtaining the product of the multiplication result and a preset multiplier threshold as the advised receiving window of the client.

* * * * *